(12) United States Patent
Ji et al.

(10) Patent No.: US 12,555,063 B2
(45) Date of Patent: Feb. 17, 2026

(54) INFORMATION OUTPUT METHODS AND APPARATUSES, COMPUTER EQUIPMENT AND READABLE STORAGE MEDIA

(71) Applicants: ZHEJIANG KOUBEI NETWORK TECHNOLOGY CO., LTD., Hangzhou (CN); Rajax Network Technology (Shanghai) Co., Ltd., Shanghai (CN)

(72) Inventors: Yun Ji, Shanghai (CN); Benshan You, Shanghai (CN); Yuan Wu, Shanghai (CN); Ping Huang, Shanghai (CN); Tian He, Shanghai (CN)

(73) Assignee: RAJAX NETWORK TECHNOLOGY (SHANGHAI) CO., LTD., Shanghai (CN)

(*) Notice: Subject to any disclaimer, the term of this patent is extended or adjusted under 35 U.S.C. 154(b) by 197 days.

(21) Appl. No.: 18/257,020

(22) PCT Filed: Dec. 9, 2021

(86) PCT No.: PCT/CN2021/136658
§ 371 (c)(1),
(2) Date: Jun. 12, 2023

(87) PCT Pub. No.: WO2022/121972
PCT Pub. Date: Jun. 16, 2022

(65) Prior Publication Data
US 2024/0095654 A1   Mar. 21, 2024

(30) Foreign Application Priority Data
Dec. 11, 2020 (CN) .......................... 202011447781.0

(51) Int. Cl.
*G06Q 10/0833* (2023.01)
*H04W 4/02* (2018.01)

(52) U.S. Cl.
CPC ........ *G06Q 10/0833* (2013.01); *H04W 4/025* (2013.01)

(58) Field of Classification Search
CPC ............. G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

| | | | |
|---|---|---|---|
| 2017/0011333 A1* | 1/2017 | Greiner | G06K 7/10722 |
| 2019/0279151 A1* | 9/2019 | Felice | G06Q 10/0832 |
| 2021/0019699 A1* | 1/2021 | Bornski | G05D 1/0022 |

FOREIGN PATENT DOCUMENTS

| | | |
|---|---|---|
| CN | 111182453 A | 5/2020 |
| CN | 111311144 A | 6/2020 |

(Continued)

OTHER PUBLICATIONS

O'Keefe, John M., and Jason Etele. "Ultrasonic localization of a quadrotor using a portable beacon." AIAA Scitech 2019 Forum. 2019. (Year: 2019).*

(Continued)

*Primary Examiner* — Emmett K. Walsh
(74) *Attorney, Agent, or Firm* — Getech Law LLC; Jun Ye

(57) ABSTRACT

Information output methods and apparatuses, computer equipment and readable storage media which relate to the field of computer technology are provided. The information output method includes: detecting whether a search connection is established between a delivery terminal and a beacon device deployed by a target physical object by using a pre-cached joint beacon atlas bound to the target physical object, where the joint beacon atlas records a set of communication identifiers covered by a physical object; if the search connection is established between the delivery ter- (Continued)

minal and the beacon device deployed by the target physical object, outputting a corresponding time point when the search connection is in a stable state as information of a delivery resource arriving at the target physical object.

20 Claims, 7 Drawing Sheets

(56) References Cited

FOREIGN PATENT DOCUMENTS

| | | | |
|---|---|---|---|
| CN | 111556442 | A | 8/2020 |
| CN | 112040407 | A | 12/2020 |
| CN | 112218238 | A | 1/2021 |
| KR | 20140100604 | A | 8/2014 |

OTHER PUBLICATIONS

CN202011447781.0—First Office Action mailed on Jan. 20, 2021, 14 pages.
CN202011447781.0—Second Office Action mailed on Feb. 9, 2021, 10 pages.
PCT/CN2021/136658—International Search Report and Written Opinion mailed on Mar. 1, 2022, 14 pages.

* cited by examiner

INFORMATION OUTPUT METHODS AND APPARATUSES, COMPUTER EQUIPMENT AND READABLE STORAGE MEDIA

CROSS-REFERENCE TO RELATED APPLICATIONS

This patent application is the U.S. national phase application of PCT Application No. PCT/CN2021/136658 filed on Dec. 9, 2021, which claims priority to Chinese patent application No. 2020114477810 filed on Dec. 11, 2020, the entire contents of the above-referred applications are incorporated herein by reference.

TECHNICAL FIELD

This application relates to the field of computer technology, and in particular, to information output methods and apparatuses, computer equipment and readable storage media.

BACKGROUND

With the advent of a digital era, takeout market has developed rapidly in recent years. For a takeout logistics system, information of a delivery resource arriving at a store is crucial for a delivery process, and especially, in a real-time delivery scenario, when the delivery resource arrives at a physical object (for example, an offline store) to pick up a to-be-delivered object, there often exists a phenomenon of delivery timeout due to waiting too long. How to accurately perceive the behavior of the delivery resource arriving at the store provides strong support for determining the responsibility for the delivery timeout.

In related art, when the delivery resource arrives at the physical object, a method may be that the delivery resource reports the information of arriving at the store, where this information is subjective and cannot accurately reflect the behavior of the delivery resource arriving at the store, for example, the delivery resource, when entering a business circle, usually selects to report all delivery orders within the business area to the store at one time, which affects the accuracy of information output; another method may be that a positioning system of delivery equipment detects positioning information, and determines the information of the behavior of the delivery resource arriving at the store according to the positioning information, where the accuracy of the positioning information detected by the positioning system is lower, so that the behavior of the delivery resource arriving at the store cannot be accurately identified, which leads to an error in an information reporting time.

SUMMARY

In view of this, in the present application, information output methods and apparatuses, computer equipment and readable storage media are provided.

According to a first aspect of the present application, an information output method is provided, including:
  detecting whether a search connection is established between a delivery terminal and a beacon device deployed by a target physical object by using a pre-cached joint beacon atlas bound to the target physical object, where the joint beacon atlas records a set of communication identifiers covered by a physical object;
  if the search connection is established between the delivery terminal and the beacon device deployed by the target physical object, outputting a corresponding time point when the search connection is in a stable state as information of a delivery resource arriving at the target physical object.

In another embodiment of the present application, detecting whether the search connection is established between the delivery terminal and the beacon device deployed by the target physical object by using the pre-cached joint beacon atlas bound to the target physical object includes:
  acquiring a scanned first communication identifier list broadcasted by a short-range beacon device, where the short-range beacon device is a beacon device within a preset distance range of the delivery terminal;
  forming the pre-cached joint beacon atlas bound to the target physical object into a second communication identifier list, and matching the second communication identifier list with the first communication identifier list to obtain a matching result of communication identifiers;
  if the matching result of the communication identifiers meets preset conditions, determining that the search connection is established between the delivery terminal and the beacon device deployed by the target physical object.

In another embodiment of the present application, acquiring the scanned first communication identifier list broadcasted by the short-range beacon device includes:
  acquiring broadcast information sent from the beacon device within the preset distance range of the delivery terminal through polling;
  extracting communication identifiers and strength indication information broadcasted by the beacon device from the broadcast information;
  forming the communication identifiers broadcasted by the beacon device into the first communication identifier list based on the strength indication information.

In another embodiment of the present application, forming the communication identifiers broadcasted by the beacon device into the first communication identifier list based on the strength indication information includes:
  acquiring position information of the delivery terminal by interacting with map engine data;
  taking the strength indication information as a basis for a distance between the delivery terminal and the beacon device and calculating distance information formed between the delivery terminal and the beacon device by using a built-in positioning algorithm of the delivery terminal and the position information of the delivery terminal;
  ordering the communication identifiers broadcasted by the beacon device according to distance values in the distance information being from small to large to form the first communication identifier list.

In another embodiment of the present application, communication identifiers in the second communication identifier list carry confidence of the communication identifiers that serve as communication identifiers broadcasted by the beacon device deployed by the target physical object; communication identifiers in the first communication identifier list carry distance information formed between the delivery terminal and the beacon device; and forming the pre-cached joint beacon atlas bound to the target physical object into the second communication identifier list, and matching the second communication identifier list with the first communication identifier list to obtain the matching result of the communication identifiers includes:
   forming the communication identifiers in the first communication identifier list in a first traversal order based on distances in the distance information formed between the delivery terminal and the beacon device being from short to long;
   forming the communication identifiers in the second communication identifier list in a second traversal order based on the confidence of the communication identifiers that serve as the communication identifiers broadcasted by the beacon device deployed by the target physical object being from high to low; and
   matching the communication identifiers in the second communication identifier list with the communication identifiers in the first communication identifier list according to the first traversal order and/or the second traversal order to obtain the matching result of the communication identifiers;
if the matching result of the communication identifiers meets the preset conditions, determining that the search connection is established between the delivery terminal and the beacon device deployed by the target physical object includes:
if the matching result of the communication identifiers is consistent, respectively acquiring confidence of consistently matched communication identifiers that serve as the communication identifiers broadcasted by the beacon device deployed by the target physical object and the distance information formed between the delivery terminal and the beacon device;
if the confidence is greater than a first preset threshold or the distance information is less than a second preset threshold, determining that the matching result of the communication identifiers meets the preset conditions, and determining that the search connection is established between the delivery terminal and the beacon device deployed by the target physical object.

In another embodiment of the present application, before detecting whether the search connection is established between the delivery terminal and the beacon device deployed by the target physical object by using the pre-cached joint beacon atlas bound to the target physical object, the method further includes:
   acquiring an order list of the delivery terminal, and transmitting target physical object information corresponding to an order in the order list to a server side, so that the server side selects a joint beacon atlas bound to the target physical object according to the target physical object information;
   receiving and caching the joint beacon atlas bound to the target physical object.

In another embodiment of the present application, after outputting the corresponding time point when the search connection is in the stable state as the information of the delivery resource arriving at the target physical object, the method further includes:
   in response to the outputting of the information of the delivery resource arriving at the target physical object, generating an order state update event;
   synchronizing the information to each information platform based on the order state update event.

According to a second aspect of the present application, an information output method is provided, including:
   receiving target physical object information corresponding to an order in an order list;
   selecting a joint beacon atlas bound to a target physical object from joint beacon atlases pre-deposited by a beacon platform and bound to physical objects based on the target physical object information;
   sending the joint beacon atlas bound to the target physical object.

In another embodiment of the present application, before receiving the target physical object information corresponding to the order in the order list, the method further includes:
   collecting a set of communication identifiers covered by each physical object, where each physical object is deployed with a beacon device that broadcasts communication identifiers at a preset time interval;
   for each physical object, based on identifier information of the physical object, binding the physical object to the set of communication identifiers of the physical object to obtain and store a joint beacon atlas bound to the physical object to a beacon platform.

According to a third aspect of the present application, an information output apparatus applied to a client side is provided, including:
   a detecting unit, configured to detect whether a search connection is established between a delivery terminal and a beacon device deployed by a target physical object by using a pre-cached joint beacon atlas bound to the target physical object, where the joint beacon atlas records a set of communication identifiers covered by a physical object;
   an outputting unit, configured to, if the search connection is established between the delivery terminal and the beacon device deployed by the target physical object, output a corresponding time point when the search connection is in a stable state as information of a delivery resource arriving at the target physical object.

In another embodiment of the present application, the detecting unit includes:
   an acquiring module, configured to acquire a scanned first communication identifier list broadcasted by a short-range beacon device, where the short-range beacon device is a beacon device within a preset distance range of the delivery terminal;
   a matching module, configured to form the pre-cached joint beacon atlas bound to the target physical object into a second communication identifier list, and match the second communication identifier list with the first communication identifier list to obtain a matching result of communication identifiers;
   a determining module, configured to, if the matching result of the communication identifiers meets preset conditions, determine that the search connection is established between the delivery terminal and the beacon device deployed by the target physical object.

In another embodiment of the present application, the acquiring module includes:
   an acquiring sub-module, configured to acquire broadcast information sent from the beacon device within the preset distance range of the delivery terminal through polling;
   an extracting sub-module, configured to extract communication identifiers and strength indication information broadcasted by the beacon device from the broadcast information;
   a generating sub-module, configured to form the communication identifiers broadcasted by the beacon device into the first communication identifier list based on the strength indication information.

In another embodiment of the present application, the generating sub-module is configured to acquire position information of the delivery terminal by interacting with map engine data;

the generating sub-module is further configured to take the strength indication information as a basis for a distance between the delivery terminal and the beacon device and calculate distance information formed between the delivery terminal and the beacon device by using a built-in positioning algorithm of the delivery terminal and the position information of the delivery terminal;

the generating sub-module is further configured to order the communication identifiers broadcasted by the beacon device according to distance values in the distance information being from small to large to form the first communication identifier list.

In another embodiment of the present application, communication identifiers in the second communication identifier list carry confidence of the communication identifiers that serve as communication identifiers broadcasted by the beacon device deployed by the target physical object; communication identifiers in the first communication identifier list carry distance information formed between the delivery terminal and the beacon device; and the matching module includes:

a first ordering sub-module, configured to form the communication identifiers in the first communication identifier list in a first traversal order based on distances in the distance information formed between the delivery terminal and the beacon device being from short to long;

a second ordering sub-module, configured to form the communication identifiers in the second communication identifier list in a second traversal order based on the confidence of the communication identifiers that serve as the communication identifiers broadcasted by the beacon device deployed by the target physical object being from high to low; and a matching sub-module, configured to match the communication identifiers in the second communication identifier list with the communication identifiers in the first communication identifier list according to the first traversal order and/or the second traversal order to obtain the matching result of the communication identifiers;

the determining module is configured to, if the matching result of the communication identifiers is consistent, respectively acquire confidence of consistently matched communication identifiers that serve as the communication identifiers broadcasted by the beacon device deployed by the target physical object and the distance information formed between the delivery terminal and the beacon device;

the determining module is further configured to, if the confidence is greater than a first preset threshold or the distance information is less than a second preset threshold, determine that the matching result of the communication identifiers meets the preset conditions, and determine that the search connection is established between the delivery terminal and the beacon device deployed by the target physical object.

In another embodiment of the present application, the apparatus further includes:

a transmitting unit, configured to, before detecting whether the search connection is established between the delivery terminal and the beacon device deployed by the target physical object by using the pre-cached joint beacon atlas bound to the target physical object, acquire an order list of the delivery terminal, and transmit target physical object information corresponding to an order in the order list to a server side, so that the server side selects a joint beacon atlas bound to the target physical object according to the target physical object information;

a caching unit, configured to receive and cache the joint beacon atlas bound to the target physical object.

In another embodiment of the present application, the apparatus further includes:

a generating unit, configure to, after outputting the corresponding time point when the search connection is in the stable state as the information of the delivery resource arriving at the target physical object, in response to the outputting of the information of the delivery resource arriving at the target physical object, generate an order state update event;

a synchronizing unit, configured to synchronize the information to each information platform based on the order state update event.

According to a fourth aspect of the present application, an information outputting apparatus applied to a server side is provided, including:

a receiving unit, configured to receive target physical object information corresponding to an order in an order list;

a selecting unit, configured to select a joint beacon atlas bound to a target physical object from joint beacon atlases pre-deposited by a beacon platform and bound to physical objects based on the target physical object information;

a sending unit, configured to send the joint beacon atlas bound to the target physical object.

In another embodiment of the present application, the apparatus further includes:

a collecting unit, configured to, before receiving the target physical object information corresponding to the order in the order list, collect a set of communication identifiers covered by each physical object, where each physical object is deployed with a beacon device that broadcasts communication identifiers at a preset time interval;

a binding unit, configured to, for each physical object, based on identifier information of the physical object, bind the physical object to the set of communication identifiers of the physical object to obtain and store a joint beacon atlas bound to the physical object to a beacon platform.

According to a fifth aspect of the present application, an information output system is provided, including: a receiving end and a sending end, where the sending end acquires an order list of a delivery terminal, and transmits target physical object information corresponding to an order in the order list to the receiving end;

the receiving end receives the target physical object information corresponding to the order in the order list, selects a joint beacon atlas bound to a target physical object from joint beacon atlases pre-deposited by a beacon platform and bound to physical objects based on the target physical object information, and sends the joint beacon atlas bound to the target physical object;

the sending end receives and caches the joint beacon atlas bound to the target physical object, and detects whether a search connection is established between the delivery terminal and a beacon device deployed by the target physical object by using a pre-cached joint beacon atlas bound to the target physical object;

if the search connection is established between the delivery terminal and the beacon device deployed by the target physical object, the sending end outputs a corresponding time point when the search connection is in a stable state as information of a delivery resource arriving at the target physical object.

According to a sixth aspect of the present application, a readable storage medium on which a computer program is stored is provided, where the program is executed by a processor to implement the information output methods as described above.

According to a seventh aspect of the present application, a client device is provided, including: a readable storage medium, a processor, and a computer program stored on the readable storage medium and being capable of running on the processor, where the program is executed by the processor to implement the information output method according to the first aspect and its embodiments.

According to an eighth aspect of the present application, a server device is provided, including: a readable storage medium, a processor, and a computer program stored on the readable storage medium and being capable of running on the processor, where the program is executed by the processor to implement the information output method according to the second aspect and its embodiments.

Through the above technical solutions, comparing the information output methods and apparatuses, the computer equipment and the readable storage media according to the present application with current existing methods in which a delivery resource reports the information of the behavior of arriving at a store or a positioning system is used to determine the information of the behavior of a delivery resource arriving at a store so as to achieve information output, in the present application, whether a search connection is established between a delivery terminal and a beacon device deployed by a target physical object is detected by using a pre-cached joint beacon atlas bound to the target physical object, where the joint beacon atlas records a set of communication identifiers covered around the physical object; if the delivery resource arrives at the vicinity of the target physical object, it will be detected that the search connection is established between the delivery terminal and the beacon device deployed by the target physical object; further, a corresponding time point when the search connection is in a stable state is output as the information of the delivery resource arriving at the target physical object, so that the behavior of the delivery resource arriving at the store can be accurately identified, there is no need for the delivery resource to manually report the information of the behavior of arriving at the store, and there is no error in an information reporting time due to human factors, which achieves the effective supervision over the information reporting time.

The above description is only an overview of the technical solutions of the present application. In order to have a clearer understanding of the technical means of the present application to implement in accordance with the contents of the specification, and in order to make the above and other purposes, features and advantages of the present application more obvious and understandable, specific implementation manners of the present application are illustrated below.

BRIEF DESCRIPTION OF THE DRAWINGS

The accompanying drawings described here are intended to provide a further understanding of the present application and constitute a part of this application. The illustrative embodiments and their description in the present application are used to explain the present application and do not form an improper limitation on the present application, where.

DETAILED DESCRIPTION OF THE EMBODIMENTS

The present application will be described in detail below with reference to the accompanying drawings and in conjunction with the embodiments. It should be noted that, in a case of no conflict, the embodiments of the present application and the features in the embodiments may be combined with each other.

The information output system involved in the present application includes a sending end and a receiving end. The sending end is a client side. The information output system may be specifically applied to an application program of a delivery terminal. In order to accurately identify the behavior of a delivery resource arriving at a store, the client side detects whether a search connection is established between the delivery terminal and a beacon device deployed by a target physical object by using a pre-cached joint beacon atlas bound to the target physical object. The joint beacon atlas records a set of communication identifiers covered by a physical object. If the delivery resource arrives at the vicinity of the target physical object and is connected to a communication identifier covered by the target physical object, a corresponding time point when the search connection is in a stable state is further output as the information of the delivery resource arriving at the target physical object. The receiving end is a server side, which may be a server side corresponding to the application program. The server side may select the joint beacon atlas bound to the target physical object from joint beacon atlases pre-deposited by a beacon platform and bound to physical objects based on target physical object information corresponding to an order in an order list transmitted by the client side, and send the joint beacon atlas bound to the target physical object to the client side for caching. Specifically, in an actual application process, through the interaction between the client side of the delivery resource and the server side, the client side may transmit the target physical object information corresponding to the order in the order list in real time, and the server side selects and returns the joint beacon atlas bound to the physical object to the client side for caching. During the order delivery, the client side detects whether the delivery resource is connected to the communication identifier covered by the target physical object by using the pre-cached joint beacon atlas bound to the target physical object. If the delivery resource is connected to the communication identifier covered by the target physical object, the behavior of the delivery resource arriving at the store is identified, and reporting information is automatically triggered. There is no need for the delivery resource to perform an additional reporting operation, and the effective supervision over reporting the time of arriving at the store is achieved.

Figure 1:
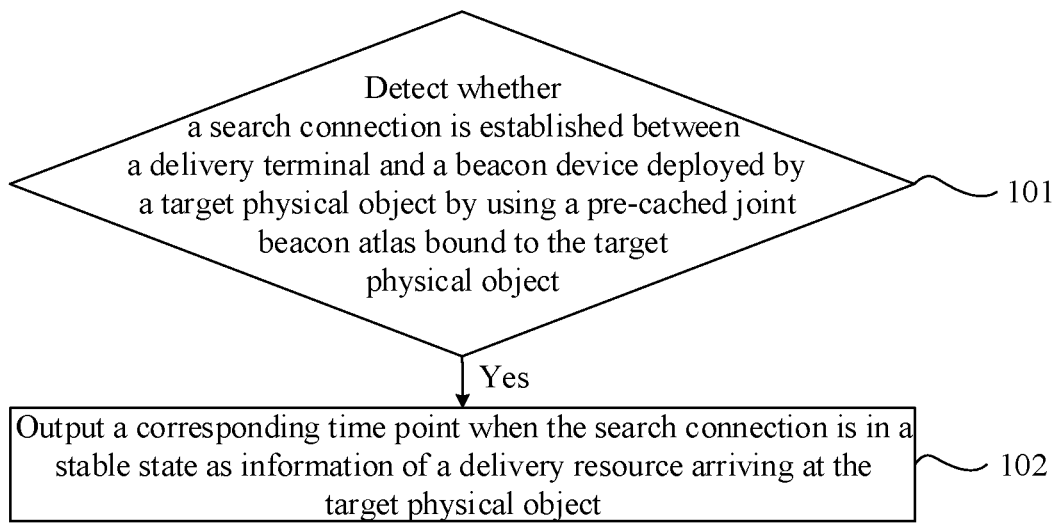
FIG. 1 is a schematic flowchart illustrating an information output method according to an embodiment of the present application.

In order to solve the above problem, in an embodiment, an information output method is provided. As shown in FIG. 1, the method is applied to a client side of a delivery terminal, and includes the following steps:

At 101, whether a search connection is established between a delivery terminal and a beacon device deployed by a target physical object is detected by using a pre-cached joint beacon atlas bound to the target physical object.

Physical objects may be offline stores corresponding to online stores, online sellers, and the like connected to a network platform. The online stores, the online sellers and the like are collectively referred to as online stores. The online stores may release objects on the network platform, for example, food products, for users to select. After a user selects objects, a delivery order may be formed. The delivery order records an address of a target physical object corresponding to an online store and a delivery address of the user who placed the order. The objects are delivered by a delivery resource. Delivery resources are not limited to delivery riders and delivery rider application terminals, but also include resources with a terminal delivery capability such as drones, robots and unmanned vehicles. The online store, as a medium for connection with the delivery resource, requires the delivery resource to first pick up the objects in the delivery order at the address of the target physical object, and further delivers the objects in the delivery order to the delivery address of the user who placed the order. Usually, in order to facilitate the statistics of customer flow data in a physical object, a beacon device may be deployed in the physical object. For example, at any position within the physical object, the beacon device may be connected to a user terminal through a broadcasted communication identifier, for example, a Bluetooth beacon or a routing beacon, and accurately position the user terminal to monitor the situation of users arriving at a store. Since a large number of beacon devices are covered around the physical object, the joint beacon atlas here records a set of communication identifiers covered by a physical object, such as Bluetooth identifiers and wireless network identifiers. The set of communication identifiers may include communication identifiers broadcasted by the beacon device deployed by the physical object, and may further include communication identifiers broadcasted by beacon devices deployed by surrounding physical objects.

Specifically, in the process of a delivery resource delivering an order, a delivery terminal will scan signals broadcasted by surrounding beacon devices at a fixed time interval. The signals carry communication identifiers of the beacon devices. As the position of the delivery terminal is changed, the received communication identifiers broadcasted by the surrounding beacon devices are constantly changed. For example, when the delivery terminal is located in position A, the surrounding beacon devices are fewer, and communication identifiers broadcasted by two beacon devices are scanned. When the delivery terminal is located in position B, the surrounding beacon devices are more, and communication identifiers broadcasted by ten beacon devices are scanned. Here, the scanned communication identifiers are displayed in the form of a beacon search list at the delivery terminal. Further, by matching the communication identifiers scanned by the delivery terminal with a set of communication identifiers covered by a target physical object, it is determined whether the communication identifiers are matched consistently, so as to detect whether a search connection is established between the delivery terminal and a beacon device deployed by the target physical object. If communication identifiers of the beacon device deployed by the target physical object are displayed in the beacon search list of the delivery terminal, it is indicated that the search connection is established between the delivery terminal and the beacon device deployed by the target physical object.

An executive body of this embodiment may be an information output apparatus or device, which may be configured on an application program of a delivery terminal. The application program may scan communication identifiers broadcasted by surrounding beacon devices in real time, and use a pre-cached joint beacon atlas bound to a target physical object. Once a communication identifier covered by the target physical object is scanned, it is indicated that a search connection is established between the delivery terminal and a beacon device deployed by the target physical object. The behavior of a delivery resource arriving at the target physical object can be accurately identified and converted into an event of the delivery resource arriving at a store, so as to accurately output the information of the delivery resource arriving at the store.

At 102, if the search connection is established between the delivery terminal and the beacon device deployed by the target physical object, a corresponding time point when the search connection is in a stable state is output as information of a delivery resource arriving at the target physical object.

While a delivery terminal scans a communication identifier sent from a beacon device, the beacon device may acquire a device identifier of the delivery terminal, so that a search connection is established between the delivery terminal and the beacon device. If the delivery terminal arrives at the vicinity of a target physical object, the delivery terminal may scan communication identifiers broadcasted by a beacon device deployed by the target physical object, so that a search connection is established between the delivery terminal and the beacon device deployed by the target physical object.

It can be understood that, due to the fact that a set of communication identifiers includes multiple communication identifiers covered by a target physical object, some communication identifiers may be broadcasted by beacon devices closer to the target physical object, while some communication identifiers may be broadcasted by beacon devices farther from the target physical object. The communication identifiers broadcasted by the beacon devices closer to the target physical object have higher credibility. In order to accurately identify the information of a delivery resource arriving at the target physical object, if a search connection is established between a delivery terminal and a communication identifier broadcasted by a beacon device farther from the target physical object, it is indicated that the delivery terminal is farther from the target physical object. A distance between the delivery terminal and the target physical object may be estimated according to the position information of the beacon device. Furthermore, when the distance is within a preset range, a corresponding time point when the search connection is in a stable state is output as the information of the delivery resource arriving at the target physical object. Similarly, if a search connection is established between a delivery terminal and a communication identifier broadcasted by a closer beacon device, it is indicated that the delivery terminal is closer to the target physical object. A time point corresponding to establishing the search connection may be directly output as the information of the delivery resource arriving at the target physical object.

Comparing the information output method according to the embodiment of the present application with current existing methods in which a delivery resource reports the information of the behavior of arriving at a store or a positioning system is used to determine the information of the behavior of a delivery resource arriving at a store so as to achieve information output, in the present application, whether a search connection is established between a delivery terminal and a beacon device deployed by a target physical object is detected by using a pre-cached joint beacon atlas bound to the target physical object, where the joint beacon atlas records a set of communication identifiers covered around the physical object; if the delivery resource arrives at the vicinity of the target physical object, it will be detected that the search connection is established between the delivery terminal and the beacon device deployed by the target physical object; further, a corresponding time point when the search connection is in a stable state is output as the information of the delivery resource arriving at the target physical object, so that the behavior of the delivery resource arriving at the store can be accurately identified, there is no need for the delivery resource to manually report the information of the behavior of arriving at the store, and there is no error in an information reporting time due to human factors, which achieves the effective supervision over the information reporting time.

Figure 2:
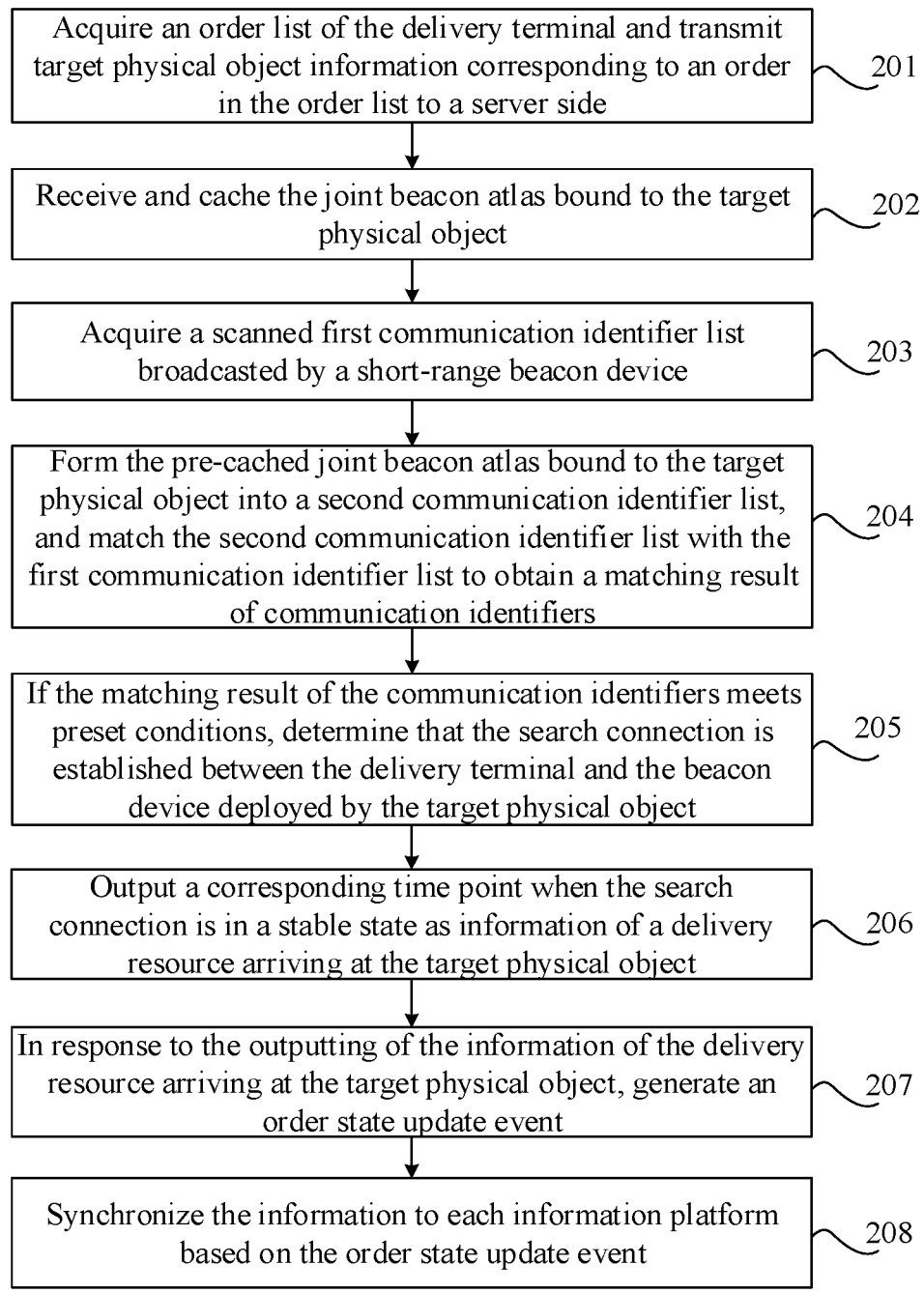
FIG. 2 is a schematic flowchart illustrating another information output method according to an embodiment of the present application.

Further, as refinement and extension of the specific implementation manners of the above embodiment, in order to fully illustrate the specific implementation process of this embodiment, in an embodiment, another information output method is provided. As shown in FIG. 2, the method includes:

At 201, an order list of the delivery terminal is acquired, and target physical object information corresponding to an order in the order list is transmitted to a server side.

In a real-time delivery scenario, delivered objects are often food products, which require a physical object to prepare the food products in time after receiving an order. However, because it usually takes too much time for the physical object to prepare the food products, a delivery resource waits too long in the physical object, resulting in timeout. If a time of the delivery resource arriving at a store cannot be accurately identified, the delivery efficiency of the food products will be affected.

In a delivery scenario, a delivery resource may use a built-in application program of a delivery terminal to monitor delivery orders released by online stores in real time. The application program may select and push suitable delivery orders to the delivery resource. The delivery resource may select delivery orders near it or on its way through the application program. If multiple delivery orders are selected, an order list may be formed and stored in the delivery terminal. The order list records order object information, target physical object information corresponding to the orders, delivery information corresponding to the orders, etc. The delivery terminal transmits target physical object information corresponding to the order list to a server side. The server side pre-collects joint beacon atlases bound to physical objects, so that the server side can select joint beacon atlases bound to target physical objects according to the target physical object information.

At 202, the joint beacon atlas bound to the target physical object is received and cached.

It can be understood that a joint beacon atlas bound to a target physical object is identifier information collected by a server side depending on a beacon device deployed by the physical object. Specifically, communication identifiers may be extracted from a beacon signal and a wife signal broadcasted by the beacon device, and position information of the physical object may be mined from massive communication identifiers through big data and cloud computing technology to form the joint beacon atlas of the physical object. The joint beacon atlas may serve as a positioning basis for determining whether a delivery resource arrives at the physical object. When a delivery terminal arrives at the vicinity of the physical object, the delivery terminal may receive the signals broadcasted by the beacon device, and a search connection may be established between the delivery terminal and the beacon device.

At 203, a scanned first communication identifier list broadcasted by a short-range beacon device is acquired.

In this embodiment, a beacon device may broadcast signals every few milliseconds. A delivery terminal, as a signal detection device, may be provided with a beacon software development kit therein, and use the beacon software development kit to scan signals broadcasted by surrounding beacon devices. Only when the delivery terminal and the beacon device are within a certain distance range, the signals broadcasted by the beacon device can be scanned. Specifically, broadcast information sent from the beacon device within a preset distance range of the delivery terminal may be acquired through polling, where the broadcast information carries communication identifiers of the beacon device, an address of the beacon device, signal strength, a state, etc.; further, communication identifiers and strength indication information broadcasted by the beacon device are extracted from the broadcast information, where the strength indication information may reflect a distance between the beacon device and the delivery terminal; the communication identifiers broadcasted by the beacon device are formed into a first communication identifier list based on the strength indication information. Therefore, communication identifiers at the top of the first communication identifier list are communication identifiers broadcasted by a beacon device closer to a delivery resource.

It can be understood that the higher the strength that the strength indication information indicates is, the shorter the distance between the beacon device and the delivery terminal is, that is, the shorter the distance between the beacon device and the delivery resource is. Specifically, in the process of forming the communication identifiers broadcasted by the beacon device into the first communication identifier list based on the strength indication information, position information of the delivery terminal is acquired by interacting with map engine data; the strength indication information is taken as a basis for a distance between the delivery terminal and the beacon device and distance information formed between the delivery terminal and the beacon device is calculated by using a built-in positioning algorithm of the delivery terminal and the position information of the delivery terminal; the communication identifiers broadcasted by the beacon device are ordered according to distance values in the distance information being from small to large to form the first communication identifier list.

Specifically, the distance information formed between the delivery terminal and the beacon device may be calculated by using an RSSI ranging method. After the distance information formed between the delivery terminal and the beacon device is calculated, due to a fixed beacon position, there may exist obstacles or interference or the like in different areas around a physical object. According to signal strength indication information when the delivery resource is in different positions and areas around the physical object, distance compensation values corresponding to the different positions and areas around the physical object where the delivery resource is may be set, and the compensation values are used to correct the distance information formed between the delivery terminal and the beacon device to improve the accuracy of the distance information.

At 204, the pre-cached joint beacon atlas bound to the target physical object is formed into a second communication identifier list, and the second communication identifier list is matched with the first communication identifier list to obtain a matching result of communication identifiers.

It can be understood that, although a joint beacon atlas bound to a target physical object is a set of communication identifiers covered by the target physical object, communication identifiers in the set of communication identifiers may not be broadcasted by a beacon device deployed by the target physical object. Therefore, each communication identifier in the set of communication identifiers is further attached with information such as beacon attribute and confidence. Here, the confidence may be used for an ordering method for the set of communication identifiers. The pre-cached joint beacon atlas bound to the target physical object is formed into the second communication identifier list. Communication identifiers in the second communication identifier list carry confidence of the communication identifiers that serve as communication identifiers broadcasted by the beacon device deployed by the target physical object. The higher the confidence is, the higher the probability of communication identifiers being broadcasted by the beacon device deployed by the target physical object is. The first communication identifier list is a set of communication identifiers obtained by a delivery terminal scanning a short-range beacon device. The distance information may be used for an ordering method for the set of communication identifiers. As described in step 203, the scanned set of communication identifiers is formed into the first communication identifier list. Communication identifiers in the first communication identifier list carry the distance information formed between the delivery terminal and the beacon device.

In the embodiment of the present application, specifically, the communication identifiers in the first communication identifier list may be formed in a first traversal order based on distances in the distance information formed between the delivery terminal and the beacon device being from short to long; the communication identifiers in the second communication identifier list may be formed in a second traversal order based on the confidence of the communication identifiers that serve as the communication identifiers broadcasted by the beacon device deployed by the target physical object being from high to low; and the communication identifiers in the second communication identifier list may be matched with the communication identifiers in the first communication identifier list according to the first traversal order and/or the second traversal order to obtain the matching result of the communication identifiers. Here, the first traversal order and the second traversal order are matching priority orders, so that communication identifiers with higher confidence and communication identifiers with a shorter distance formed between the delivery terminal and the beacon device can be matched first. In this way, successful match can be ensured at a first time when the delivery terminal scans the signals broadcasted by the beacon device deployed by the target physical object, which improves the efficiency of identifying the behavior of a delivery resource arriving at a store.

Specifically, in practical application scenarios, the first traversal order in which the communication identifiers in the first communication identifier list are formed is A1-A3-A4-A2, and the second traversal order in which the communication identifiers in the second communication identifier list are formed is B2-B3-B1-B4. Here, priority may be given to the first communication identifier list for matching. That is, A1, A3, A4 and A2 are respectively matched with B2-B3-B1-B4. Priority may be given to the second communication identifier list for matching. That is, B2, B3, B1 and B4 are respectively matched with A1-A3-A4-A2. The communication identifiers in the first communication identifier list may be mixedly matched with the communication identifiers in the second communication identifier list, which is not limited herein.

It can be understood that the above description is given only for the situation where a joint beacon atlas is formed into a second communication identifier list. In practical applications, types of beacon devices may be various. For example, Bluetooth beacon devices may scan Bluetooth signals, and wireless network beacons may scan wireless network signals. In this case, joint beacon atlases may form multiple second communication identifier lists, and a delivery terminal may scan multiple first communication identifier lists broadcasted by short-range beacon devices, so that, for the signals broadcasted by different types of beacon devices, communication identifiers in the first communication identifier lists are matched with communication identifiers in the second communication identifier lists. Here, a matching result of the communication identifiers may be that various types of beacon devices are successfully matched, or beacon devices with highest credibility in various types of beacon devices are successfully matched. For example, Bluetooth signals have a higher requirement for distance. If a delivery resource does not arrive at a target physical object, it is difficult to establish a search connection between a delivery terminal and a Bluetooth beacon device deployed by the target physical object. Therefore, a matching result of the Bluetooth beacon device is prioritized as a basis for determining whether the matching is successful.

At 205, if the matching result of the communication identifiers meets preset conditions, it is determined that the search connection is established between the delivery terminal and the beacon device deployed by the target physical object.

It can be understood that the matching result here may indicate whether there exists the same communication identifier in the first communication identifier list and the second communication identifier list. If the matching result of the communication identifiers is consistent, it is indicated that there exists the same communication identifier. In order to screen the communication identifiers, confidence of consistently matched communication identifiers that serve as the communication identifiers broadcasted by the beacon device deployed by the target physical object and the distance information formed between the delivery terminal and the beacon device are respectively acquired; if the confidence is greater than a first preset threshold or the distance information is less than a second preset threshold, it is determined that the matching result of the communication identifiers meets the preset conditions, and it is determined that the search connection is established between the delivery terminal and the beacon device deployed by the target physical object.

On the contrary, if the confidence is less than the first preset threshold and the distance information is greater than the second preset threshold, it is indicated that the delivery terminal is farther from the beacon device and the confidence of the beacon device is lower, that is, the probability of the beacon device being a beacon device deployed by the target physical object is lower, thereby it is determined that no search connection is established between the delivery terminal and the beacon device deployed by the target physical object.

At 206, the corresponding time point when the search connection is in the stable state is output as the information of the delivery resource arriving at the target physical object Due to the fact that a time point of establishing a search connection may not be an accurate time of a delivery resource arriving at a target physical object, in order to ensure the accuracy of identifying the time of the delivery resource arriving at a store, as a method for determining a corresponding time point when the search connection is in a stable state, within a preset time period after a delivery terminal identifies a communication identifier covered by the target physical object, it may be detected that the communication identifier is still in a communication identifier list scanned by the delivery terminal, indicating that the delivery resource arrives at the target physical object. A preset time point after the preset time period is output as the information of the delivery resource arriving at the target physical object. The preset time period may be set according to actual conditions. As another method for determining a corresponding time point when the search connection is in a stable state, after a delivery terminal identifies a communication identifier covered by the target physical object, confidence of the communication identifier that serves as a communication identifier broadcasted by a beacon device deployed by the target physical object may be acquired. If the communication identifier is a communication identifier with highest confidence in a communication identifier list, it is indicated that the delivery resource arrives at the target physical object. If the communication identifier is not a communication identifier with highest confidence in the communication identifier list, it is indicated that the delivery resource may be close to the target physical object. Further, a preset time point corresponding to the detected communication identifier with the highest confidence is acquired, and the preset time point is output as the information of the delivery resource arriving at the target physical object.

At 207, in response to the outputting of the information of the delivery resource arriving at the target physical object, an order state update event is generated.

It can be understood that the information of the delivery resource arriving at the target physical object may reflect time information and state information of the delivery resource picking up corresponding objects to some extent. The time information, as a key time for calibrating the delivery resource that arrives at a store during the delivery, does not need to be manually reported by the delivery resource. Reporting the information of arriving at the store is automatically triggered. The state information, as a key node for updating an order state, may trigger an order state update event at a first time after the delivery resource arrives at the target physical object, and automatically update the order state.

At 208, the information is synchronized to each information platform based on the order state update event.

The information platform here may include a platform terminal involved during the delivery, such as delivery rider application terminals, an order platform, and driving device terminals. Time information is a key factor on a whole link. Considering a transmission direction of the time information on the whole link, time information on an upstream link has an impact on a downstream link, and a client side directly synchronizes time information to the information platform on the downstream link through transmission, without performing any processing on the time information.

In actual delivery scenarios, a delivery resource, after arriving at a target physical object, does not need to manually report the behavior of arriving at a store. An application program in a delivery terminal may automatically scan communication identifiers broadcasted by surrounding beacon devices, and match the communication identifiers with a cached joint beacon atlas, thereby automatically identifying the behavior of arriving at the store, and improving the accuracy of outputting a time of arriving at the store.

Figure 3:
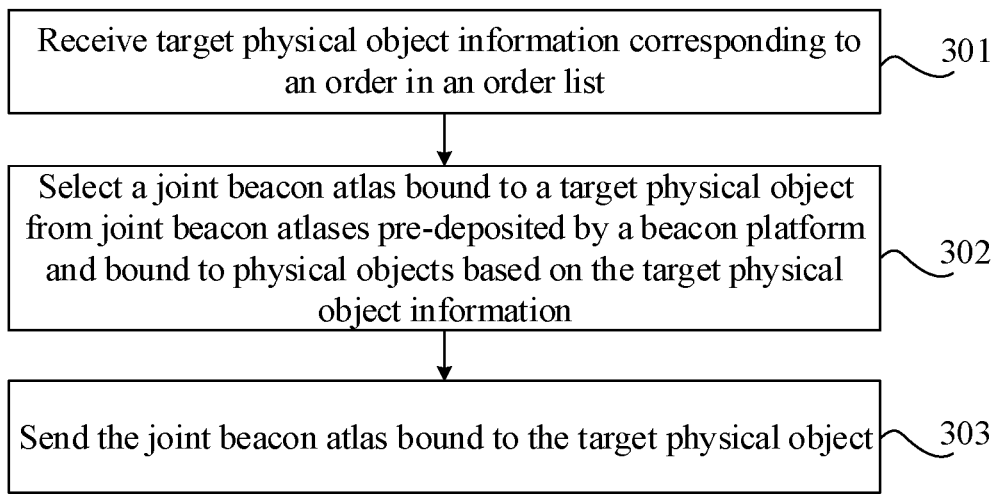
FIG. 3 is a schematic flowchart illustrating another information output method according to an embodiment of the present application.

In an embodiment, another information output method is provided. As shown in FIG. 3, the method is applied to a server side, and includes the following steps:

At 301, target physical object information corresponding to an order in an order list is received.

The server side here is equivalent to a server side corresponding to a delivery terminal, and the target physical object information corresponding to the order may include an address, business hours, object categories and other information of a target physical object.

At 302, a joint beacon atlas bound to a target physical object is selected from joint beacon atlases pre-deposited by a beacon platform and bound to physical objects based on the target physical object information.

Since an indoor environment is a scenario with rich beacons, a large number of installed Bluetooth, wireless network and other beacon devices may better characterize indoor behavior and state from a perspective, and a physical object is often covered by the large number of Bluetooth, wireless network and other beacon devices. Information broadcasted by these beacon devices may provide a basis for perceiving the behavior of a deliver resource arriving at a store in an indoor scenario.

Joint beacon atlases may include two types of beacons. One type is a Bluetooth beacon atlas. A delivery resource may monitor signals broadcasted by a Bluetooth beacon device deployed by a target physical object while monitoring signals broadcasted by Bluetooth beacon devices deployed by other physical objects, indicating that physical objects have a proximity relationship therebetween, and further the credibility of communication identifiers is scored by using the proximity relationship, so that communication identifiers with different confidence covered by the target physical object are formed. The other type is a wireless network beacon atlas. A physical position of a delivery resource is bound to a wireless network beacon device, and thereby signals broadcasted by the wireless network beacon device are transformed into communication identifiers with physical meaning. By mainly relying on wireless signals collected by the wireless network beacon device within a physical object, and using big data and cloud computing to mine position information from massive wireless signals, communication identifiers with different position information covered by the physical object are formed. For the convenience of query, here, communication identifiers unique to Bluetooth beacon devices and communication identifiers unique to wireless network beacon devices may be respectively bound to physical objects to form joint beacon atlases.

Specifically, the process of the beacon platform pre-depositing the joint beacon atlases bound to the physical objects may be implemented by: collecting a set of communication identifiers covered by each physical object, wherein each physical object is deployed with a beacon device that broadcasts communication identifiers at a preset time interval; further, for each physical object, based on identifier information of the physical object, binding the physical object to the set of communication identifiers of the physical object to obtain and store a joint beacon atlas bound to the physical object to the beacon platform. The joint beacon atlas may serve as a basis for automatically identifying the behavior of arriving at a store during the delivery. On one hand, the delivery experience of delivery resources is optimized, and on the other hand, the time of a delivery resource arriving at the store is more real and accurate, which provides exact offline data for intelligent scheduling.

At 303, the joint beacon atlas bound to the target physical object is sent.

Figure 4:
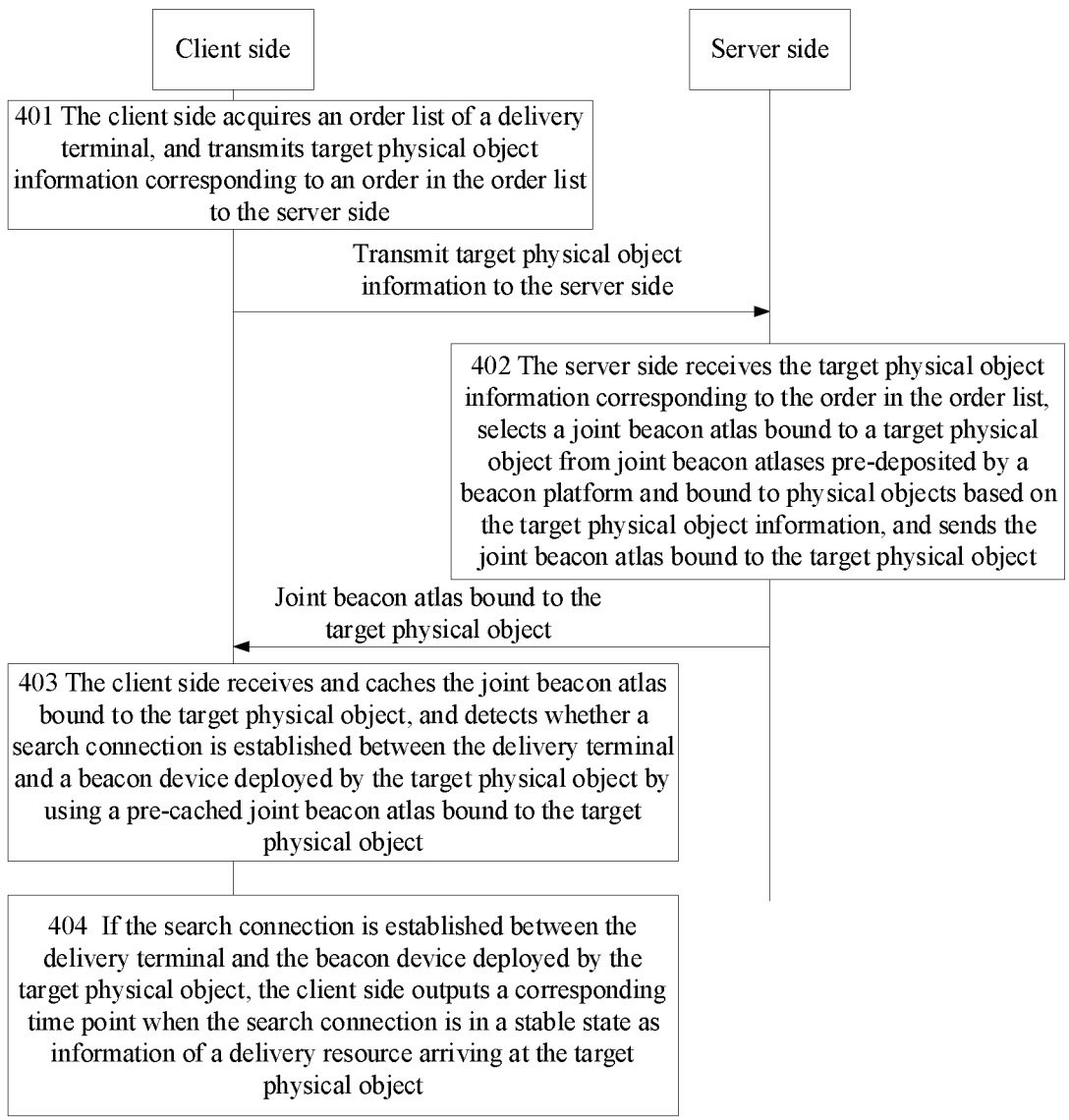
FIG. 4 is an interaction timing diagram illustrating an information output method according to an embodiment of the present application.

In an embodiment of the present application, another information output method is provided. As shown in FIG. 4, the method involves the interaction between a client side and a server side, and includes:

At 401, the client side acquires an order list of a delivery terminal, and transmits target physical object information corresponding to an order in the order list to the server side.

At 402, the server side receives the target physical object information corresponding to the order in the order list, selects a joint beacon atlas bound to a target physical object from joint beacon atlases pre-deposited by a beacon platform and bound to physical objects based on the target physical object information, and sends the joint beacon atlas bound to the target physical object.

At 403, the client side receives and caches the joint beacon atlas bound to the target physical object, and detects whether a search connection is established between the delivery terminal and a beacon device deployed by the target physical object by using a pre-cached joint beacon atlas bound to the target physical object.

At 404, if the search connection is established between the delivery terminal and the beacon device deployed by the target physical object, the client side outputs a corresponding time point when the search connection is in a stable state as information of a delivery resource arriving at the target physical object.

It can be understood that the server side may select a joint beacon atlas bound to a target physical object from joint beacon atlases pre-deposited by a beacon platform and bound to physical objects, and the client side may cache the joint beacon atlas bound to the target physical object locally. In addition to communication identifiers, the joint beacon atlas is attached with information such as beacon attribute and confidence. The client side scans signals broadcasted by beacon devices near it to extract a communication identifier list. If a communication identifier that is matched with the joint beacon atlas of the target physical object is scanned from the communication identifier list, it is indicated that the behavior of a delivery resource arriving at a store is identified. A corresponding time point when a search connection is in a stable state is output as the information of the delivery resource arriving at the target physical object, which can identify the real behavior of the delivery resource arriving at the store.

Figure 5:
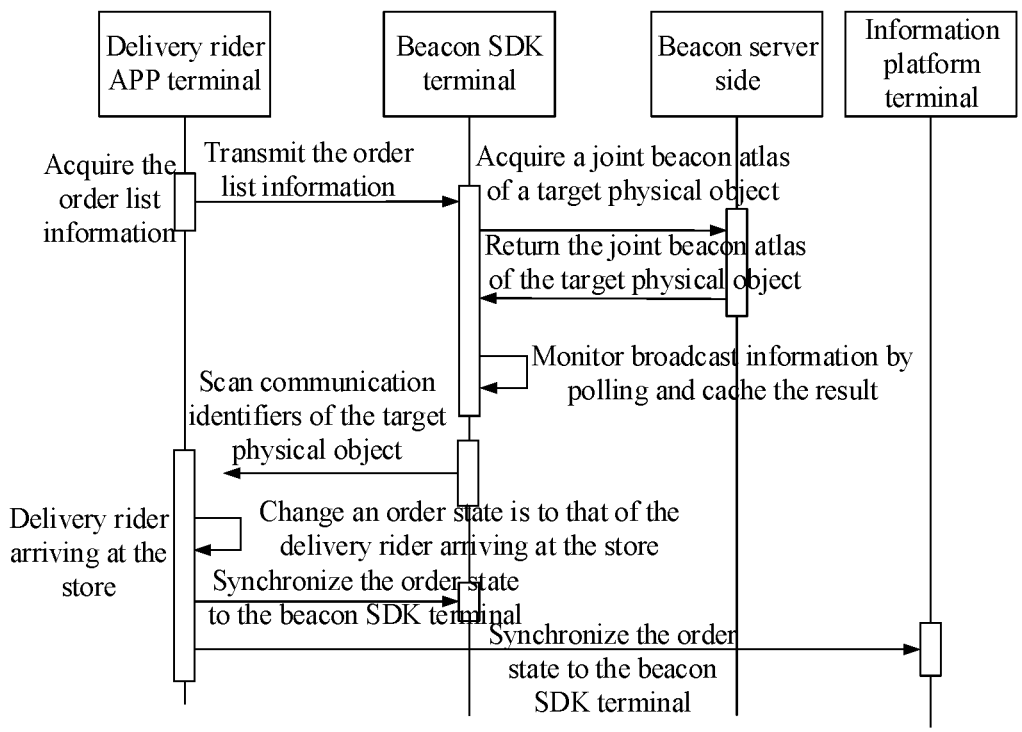
FIG. 5 is an interaction timing diagram illustrating another information output method according to an embodiment of the present application.

Specifically, in practical application scenarios of order delivery, as shown in FIG. 5, the delivery process involves a delivery rider APP terminal, a beacon SDK terminal, a beacon server side, and an information platform terminal. The delivery rider APP terminal and the beacon SDK terminal may serve as client sides for beacon transmission and event acquisition. During the beacon transmission, the rider APP terminal transmits current order list information of a delivery rider to the beacon SDK terminal at a fixed time interval. The beacon SDK terminal, after acquiring the order list information, acquires a joint beacon atlas of a target physical object from the beacon server side, and after receiving the joint beacon atlas returned from the beacon server side, caches the joint beacon atlas locally. During the event acquisition, the beacon SDK terminal acquires scanned Bluetooth communication identifier list and wireless network communication identifier list through polling, and matches the scanned Bluetooth communication identifier list and wireless network communication identifier list with the locally cached joint beacon atlas. After the matching is successful, an event of the delivery rider APP terminal arriving at a store is triggered; an order state update event is triggered; an order state is changed to that of the delivery rider arriving at the store; and after the order state is transmitted to a downstream link, a voice broadcast reminder of arriving at the store may be made locally to synchronize the order state to the beacon SDK terminal and the information platform terminal. The information platform terminal may include a delivery rider platform terminal, a driving platform terminal, an order platform and other platform terminals involved during the delivery.

It should be noted that, in order to distinguish the execution effect on an order state change and whether details of event acquisition are accurate, after an order is completed, a scanning record of communication identifiers and a matching record of the communication identifiers are uploaded to order details, so that the entire process of identifying the behavior of arriving at a store can be analyzed to ensure the accuracy and coverage of subsequent identification.

Figure 6:
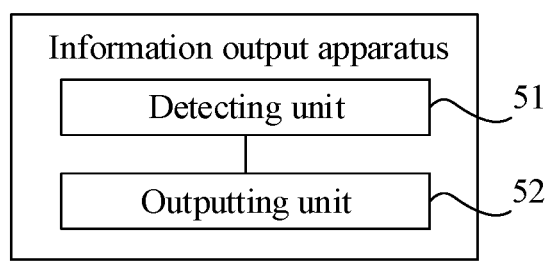
FIG. 6 is a schematic structural diagram illustrating an information output apparatus according to an embodiment of the present application.

Further, as specific implementation of the methods in FIGS. 1-2, in an embodiment of the present application, an information output apparatus applied to a client side is provided. As shown in FIG. 6, the apparatus includes: a detecting unit 51 and an outputting unit 52.

The detecting unit 51 is configured to detect whether a search connection is established between a delivery terminal and a beacon device deployed by a target physical object by using a pre-cached joint beacon atlas bound to the target physical object, where the joint beacon atlas records a set of communication identifiers covered by a physical object;

The outputting unit 52 is configured to, if the search connection is established between the delivery terminal and the beacon device deployed by the target physical object, output a corresponding time point when the search connection is in a stable state as information of a delivery resource arriving at the target physical object.

Comparing the information output apparatus according to the embodiment of the present application with current existing methods in which a delivery resource reports the information of the behavior of arriving at a store or a positioning system is used to determine the information of the behavior of a delivery resource arriving at a store so as to achieve information output, in the present application, whether a search connection is established between a delivery terminal and a beacon device deployed by a target physical object is detected by using a pre-cached joint beacon atlas bound to the target physical object, where the joint beacon atlas records a set of communication identifiers covered around the physical object; if the delivery resource arrives at the vicinity of the target physical object, it will be detected that the search connection is established between the delivery terminal and the beacon device deployed by the target physical object; further, a corresponding time point when the search connection is in a stable state is output as the information of the delivery resource arriving at the target physical object, so that the behavior of the delivery resource arriving at the store can be accurately identified, there is no need for the delivery resource to manually report the information of the behavior of arriving at the store, and there is no error in an information reporting time due to human factors, which achieves the effective supervision over the information reporting time.

Figure 7:
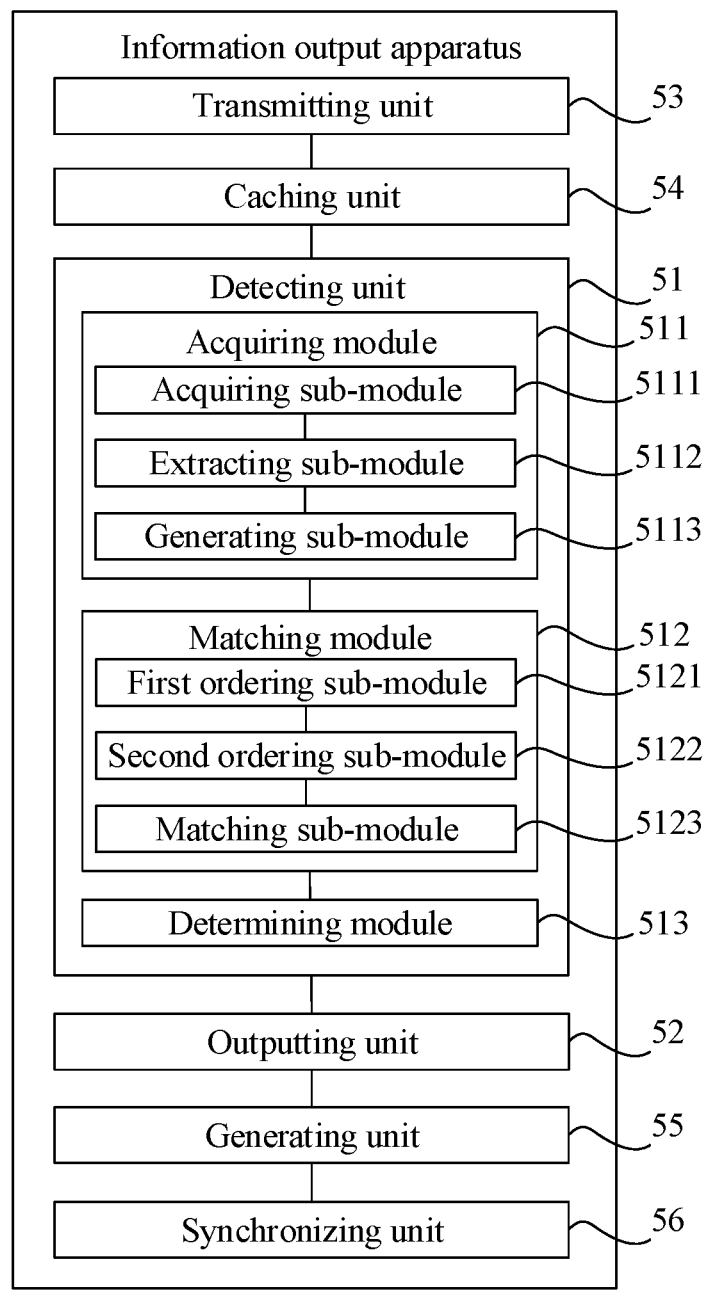
FIG. 7 is a schematic structural diagram illustrating another information output apparatus according to an embodiment of the present application.

In a specific application scenario, as shown in FIG. 7, the detecting unit 51 includes:
- an acquiring module 511, configured to acquire a scanned first communication identifier list broadcasted by a short-range beacon device, where the short-range beacon device is a beacon device within a preset distance range of the delivery terminal;
- a matching module 512, configured to form the pre-cached joint beacon atlas bound to the target physical object into a second communication identifier list, and match the second communication identifier list with the first communication identifier list to obtain a matching result of communication identifiers;
- a determining module 513, configured to, if the matching result of the communication identifiers meets preset conditions, determine that the search connection is established between the delivery terminal and the beacon device deployed by the target physical object.

In a specific application scenario, as shown in FIG. 7, the acquiring module 511 includes:
- an acquiring sub-module 5111, configured to acquire broadcast information sent from the beacon device within the preset distance range of the delivery terminal through polling;
- an extracting sub-module 5112, configured to extract communication identifiers and strength indication information broadcasted by the beacon device from the broadcast information;
- a generating sub-module 5113, configured to form the communication identifiers broadcasted by the beacon device into the first communication identifier list based on the strength indication information.

In a specific application scenario, the generating sub-module 5113 is configured to acquire position information of the delivery terminal by interacting with map engine data;
the generating sub-module 5113 is further configured to take the strength indication information as a basis for a distance between the delivery terminal and the beacon device and calculate distance information formed between the delivery terminal and the beacon device by using a built-in positioning algorithm of the delivery terminal and the position information of the delivery terminal;
the generating sub-module 5113 is further configured to order the communication identifiers broadcasted by the beacon device according to distance values in the distance information being from small to large to form the first communication identifier list.

In a specific application scenario, as shown in FIG. 7, communication identifiers in the second communication identifier list carry confidence of the communication identifiers that serve as communication identifiers broadcasted by the beacon device deployed by the target physical object; communication identifiers in the first communication identifier list carry distance information formed between the delivery terminal and the beacon device; and the matching module 512 includes:
- a first ordering sub-module 5121, configured to form the communication identifiers in the first communication identifier list in a first traversal order based on distances in the distance information formed between the delivery terminal and the beacon device being from short to long;
- a second ordering sub-module 5122, configured to form the communication identifiers in the second communication identifier list in a second traversal order based on the confidence of the communication identifiers that serve as the communication identifiers broadcasted by the beacon device deployed by the target physical object being from high to low; and
- a matching sub-module 5123, configured to match the communication identifiers in the second communication identifier list with the communication identifiers in the first communication identifier list according to the first traversal order and/or the second traversal order to obtain the matching result of the communication identifiers;
- the determining module 513 is configured to, if the matching result of the communication identifiers is consistent, respectively acquire confidence of consistently matched communication identifiers that serve as the communication identifiers broadcasted by the beacon device deployed by the target physical object and the distance information formed between the delivery terminal and the beacon device;
- the determining module 513 is further configured to, if the confidence is greater than a first preset threshold or the distance information is less than a second preset threshold, determine that the matching result of the communication identifiers meets the preset conditions, and determine that the search connection is established between the delivery terminal and the beacon device deployed by the target physical object.

In a specific application scenario, as shown in FIG. 7, the apparatus further includes:
- a transmitting unit 53, configured to, before detecting whether the search connection is established between the delivery terminal and the beacon device deployed by the target physical object by using the pre-cached joint beacon atlas bound to the target physical object, acquire an order list of the delivery terminal, and transmit target physical object information corresponding to an order in the order list to a server side, so that the server side selects a joint beacon atlas bound to the target physical object according to the target physical object information;
- a caching unit 54, configured to receive and cache the joint beacon atlas bound to the target physical object.

In a specific application scenario, as shown in FIG. 7, the apparatus further includes:
- a generating unit 55, configure to, after outputting the corresponding time point when the search connection is in the stable state as the information of the delivery resource arriving at the target physical object, in response to the outputting of the information of the delivery resource arriving at the target physical object, generate an order state update event;

a synchronizing unit 56, configured to synchronize the information to each information platform based on the order state update event.

It should be noted that, for other corresponding description of each functional unit involved in the information output apparatus applied to the client side according to this embodiment, reference may be made to corresponding description in FIGS. 1 and 2, which will not be repeated here.

Figure 8:
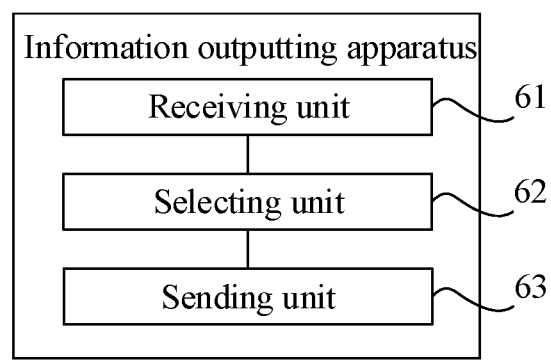
FIG. 8 a schematic structural diagram illustrating another information output apparatus according to an embodiment of the present application.

Further, as specific implementation of the method in FIG. 3, in an embodiment of the present application, an information outputting apparatus applied to a server side is provided. As shown in FIG. 8, the apparatus includes: a receiving unit 61, a selecting unit 62 and a sending unit 63.

The receiving unit 61 is configured to receive target physical object information corresponding to an order in an order list;

The selecting unit 62 is configured to select a joint beacon atlas bound to a target physical object from joint beacon atlases pre-deposited by a beacon platform and bound to physical objects based on the target physical object information;

The sending unit 63 is configured to send the joint beacon atlas bound to the target physical object.

Figure 9:
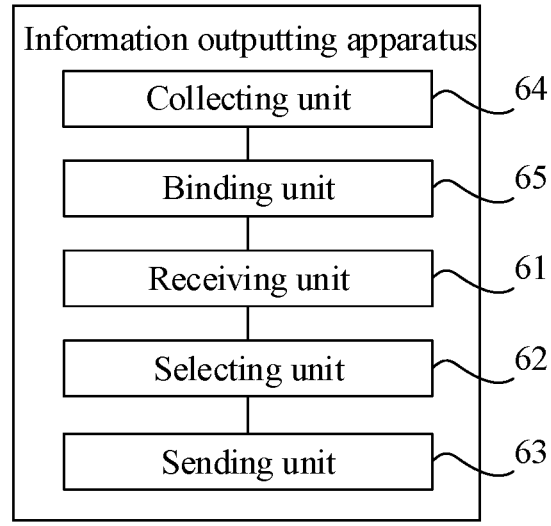
FIG. 9 a schematic structural diagram illustrating another information output apparatus according to an embodiment of the present application.

In a specific application scenario, as shown in FIG. 9, the apparatus further includes:

a collecting unit 64, configured to, before receiving the target physical object information corresponding to the order in the order list, collect a set of communication identifiers covered by each physical object, where each physical object is deployed with a beacon device that broadcasts communication identifiers at a preset time interval;

a binding unit 65, configured to, for each physical object, based on identifier information of the physical object, bind the physical object to the set of communication identifiers of the physical object to obtain and store a joint beacon atlas bound to the physical object to a beacon platform.

It should be noted that, for other corresponding description of each functional unit involved in the information output apparatus applied to the server side according to this embodiment, reference may be made to corresponding description in FIG. 3, which will not be repeated here.

Based on the methods shown in FIGS. 1-2, correspondingly, in an embodiment of the present application, a readable storage medium on which a computer program is stored is provided, where the program is executed by a processor to implement the information output method shown in FIGS. 1-2. Based on the method shown in FIG. 3, correspondingly, in an embodiment of the present application, another readable storage medium on which a computer program is stored is provided, where the program is executed by a processor to implement the information output method shown in FIG. 3.

Based on such understanding, the technical solutions of the present application may be embodied in the form of a software product. The software product may be stored in a non-volatile readable storage medium (such as a CD-ROM, a USB flash disk or a mobile hard disk), including several instructions for enabling a computer device (such as a personal computer, a server, or a network device) to execute the methods described in the implementation scenarios of the present application.

Based on the methods shown in FIGS. 1-2 and the apparatus embodiments shown in FIGS. 6-7, in order to achieve the above purpose, in an embodiment of the present application, a client device is provided, which may be specifically a computer, a smart phone, a tablet computer, a smart watch or other network device. The device includes a readable storage medium and a processor. The readable storage medium is configured to store a computer program. The processor is configured to execute the computer program to implement the information output method shown in FIGS. 1-2.

Based on the method shown in FIG. 3 and the apparatus embodiments shown in FIGS. 8-9, in order to achieve the above purpose, in an embodiment of the present application, a server device is provided, which may be specifically a computer, a server or other network device. The device includes a readable storage medium and a processor. The readable storage medium is configured to store a computer program. The processor is configured to execute the computer program to implement the information output method shown in FIG. 3.

Optionally, the above two devices may further include user interfaces, network interfaces, cameras, Radio Frequency (RF) circuits, sensors, audio circuits, WI-FI modules, etc. The user interfaces may include a display, input units such as a keyboard, etc. Optionally, the user interfaces may further include USB interfaces, card reader interfaces, etc. Optionally, the network interfaces may include standard wired interfaces, wireless interfaces (such as WI-FI interfaces), etc.

Those skilled in the art can understand that structures of the information output apparatuses provided in the embodiments do not constitute a limitation on the apparatuses, and may include more or less components, or combinations of some components, or different component arrangements.

The readable storage medium may further include an operating system and a network communication module. The operating system is a program that manages device hardware and software resources of store search information processing, and supports an information processing program and running of other software and/or programs. The network communication module is configured to achieve communication between components inside the readable storage medium, as well as communication with other hardware and software in an information processing apparatus.

Through the description of the embodiments, those skilled in the art can clearly understand that the present application can be implemented by software plus a necessary universal hardware platform or by hardware. By applying the technical solutions of the present application, compared with current existing methods, in the present application, it is detected whether a search connection is established between a delivery terminal and a beacon device deployed by a target physical object by using a pre-cached joint beacon atlas bound to the target physical object, so that the behavior of a delivery resource arriving at a store can be accurately identified, there is no need for the delivery resource to manually report the information of the behavior of it arriving at the store, and there is no error in an information reporting time due to human factors, which achieves the effective supervision over the information reporting time.

Those skilled in the art can understand that the accompanying drawings are only schematic diagrams of preferred implementation scenarios, and modules or processes in the accompanying drawings may not be necessary for implementing the present application. Those skilled in the art can understand that the apparatus modules in the implementation scenarios may be distributed in the apparatuses in the implementation scenarios according to the description of the implementation scenarios, or be correspondingly changed and located in one or more apparatuses different from that in the implementation scenarios. The modules in the implementation scenarios may be merged into one module or be further divided into multiple sub-modules.

The order of the embodiments of the present application is only for description, but does not represent the advantages or disadvantages of the implementation scenarios. The above disclosed are only several specific implementation scenarios of the present application, but the present application is not limited thereto. Any changes that those skilled in the art can think of should fall within the protection scope of this application.

What is claimed is:

1. An information output method, comprising:
   detecting whether a search connection is established between a delivery terminal and a beacon device deployed by a target physical object by using a pre-cached joint beacon atlas bound to the target physical object, wherein the joint beacon atlas records a set of communication identifiers covered by a physical object; wherein the detecting whether the search connection is established between the delivery terminal and the beacon device deployed by the target physical object comprises:
      forming communication identifiers scanned by the delivery terminal into a first communication identifier list; wherein the communication identifiers in the first communication identifier list carry distance information formed between the delivery terminal and the beacon device;
      forming the joint beacon atlas into a second communication identifier list, wherein communication identifiers in the second communication identifier list carry confidence of the communication identifiers that serve as communication identifiers broadcasted by the beacon device deployed by the target physical object;
      matching the communication identifiers in the second communication identifier list with the communication identifiers in the first communication identifier list; and
      determining that the search connection is established between the delivery terminal and the beacon device deployed by the target physical object, in response to confidence carried by consistently matched communication identifier being greater than a first preset threshold or distance information carried by consistently matched communication identifier being less than a second preset threshold; and
   if the search connection is established between the delivery terminal and the beacon device deployed by the target physical object, outputting a corresponding time point when the search connection is in a stable state as information of a delivery resource arriving at the target physical object.

2. The method of claim 1, wherein the forming the communication identifiers scanned by the delivery terminal into the first communication identifier list comprises:
   acquiring a scanned communication identifier broadcasted by a short-range beacon device to form the first communication identifier list, wherein the short-range beacon device is a beacon device within a preset distance range of the delivery terminal.

3. The method of claim 2, wherein the acquiring the scanned communication identifier broadcasted by the short-range beacon device to form the first communication identifier list comprises:
   acquiring broadcast information sent from the beacon device within the preset distance range of the delivery terminal through polling;
   extracting communication identifiers and strength indication information broadcasted by the beacon device from the broadcast information;
   forming the communication identifiers broadcasted by the beacon device into the first communication identifier list based on the strength indication information.

4. The method of claim 3, wherein forming the communication identifiers broadcasted by the beacon device into the first communication identifier list based on the strength indication information comprises:
   acquiring position information of the delivery terminal by interacting with map engine data;
   taking the strength indication information as a basis for a distance between the delivery terminal and the beacon device and calculating distance information formed between the delivery terminal and the beacon device by using a built-in positioning algorithm of the delivery terminal and the position information of the delivery terminal;
   ordering the communication identifiers broadcasted by the beacon device according to distance values in the distance information being from small to large to form the first communication identifier list.

5. The method of claim 1, wherein
   matching the communication identifiers in the second communication identifier list with the communication identifiers in the first communication identifier list comprises:
      forming the communication identifiers in the first communication identifier list in a first traversal order based on distances in the distance information formed between the delivery terminal and the beacon device being from short to long;
      forming the communication identifiers in the second communication identifier list in a second traversal order based on the confidence of the communication identifiers that serve as the communication identifiers broadcasted by the beacon device deployed by the target physical object being from high to low; and
      matching the communication identifiers in the second communication identifier list with the communication identifiers in the first communication identifier list according to the first traversal order and/or the second traversal order to obtain the matching result of the communication identifiers.

6. The method of claim 1, wherein before detecting whether the search connection is established between the delivery terminal and the beacon device deployed by the target physical object by using the pre-cached joint beacon atlas bound to the target physical object, the method further comprises:
   acquiring an order list of the delivery terminal, and transmitting target physical object information corresponding to an order in the order list to a server side, so that the server side selects a joint beacon atlas bound to the target physical object according to the target physical object information;
   receiving and caching the joint beacon atlas bound to the target physical object.

7. The method of claim 1, wherein after outputting the corresponding time point when the search connection is in the stable state as the information of the delivery resource arriving at the target physical object, the method further comprises:
in response to the outputting of the information of the delivery resource arriving at the target physical object, generating an order state update event;
synchronizing the information to each information platform based on the order state update event.

8. An information output method, comprising:
receiving target physical object information corresponding to an order in an order list;
selecting a joint beacon atlas bound to a target physical object from joint beacon atlases pre-deposited by a beacon platform and bound to physical objects based on the target physical object information;
sending the joint beacon atlas bound to the target physical object, so that:
communication identifiers scanned by a delivery terminal form a first communication identifier list, wherein the communication identifiers in the first communication identifier list carry distance information formed between the delivery terminal and beacon devices deployed by the target physical object;
the joint beacon atlas form a second communication identifier list, wherein communication identifiers in the second communication identifier list carry confidence of the communication identifiers that serve as communication identifiers broadcasted by the beacon devices deployed by the target physical object; and
a corresponding time point when a search connection is in a stable state is output as information of a delivery resource arriving at the target physical object, in response to confidence carried by communication identifier consistently matched in the first communication identifier list and the second communication identifier list being greater than a first preset threshold or distance information carried by communication identifier consistently matched in the first communication identifier list and the second communication identifier list being less than a second preset threshold.

9. The method of claim 8, wherein before receiving the target physical object information corresponding to the order in the order list, the method further comprises:
collecting a set of communication identifiers covered by each physical object, wherein each physical object is deployed with a beacon device that broadcasts communication identifiers at a preset time interval; for each physical object, based on identifier information of the physical object, binding the physical object to the set of communication identifiers of the physical object to obtain and store a joint beacon atlas bound to the physical object to a beacon platform.

10. An information output system, comprising: a receiving end and a sending end, wherein
the sending end acquires an order list of a delivery terminal, and transmits target physical object information corresponding to an order in the order list to the receiving end;
the receiving end receives the target physical object information corresponding to the order in the order list, selects a joint beacon atlas bound to a target physical object from joint beacon atlases pre-deposited by a beacon platform and bound to physical objects based on the target physical object information, and sends the joint beacon atlas bound to the target physical object;
the sending end receives and caches the joint beacon atlas bound to the target physical object, and detects whether a search connection is established between the delivery terminal and a beacon device deployed by the target physical object by using a pre-cached joint beacon atlas bound to the target physical object; wherein detecting whether the search connection is established between the delivery terminal and the beacon device deployed by the target physical object comprises:
forming communication identifiers scanned by the delivery terminal into a first communication identifier list; wherein the communication identifiers in the first communication identifier list carry distance information formed between the delivery terminal and the beacon device;
forming the joint beacon atlas into a second communication identifier list, wherein communication identifiers in the second communication identifier list carry confidence of the communication identifiers that serve as communication identifiers broadcasted by the beacon device deployed by the target physical object;
matching the communication identifiers in the second communication identifier list with the communication identifiers in the first communication identifier list; and
determining that the search connection is established between the delivery terminal and the beacon device deployed by the target physical object, in response to confidence carried by consistently matched communication identifier being greater than a first preset threshold or distance information carried by consistently matched communication identifier being less than a second preset threshold; and
if the search connection is established between the delivery terminal and the beacon device deployed by the target physical object, the sending end outputs a corresponding time point when the search connection is in a stable state as information of a delivery resource arriving at the target physical object.

11. A non-transitory readable storage medium on which a computer program is stored, wherein the program is executed by a processor to implement the information output method of claim 1.

12. A non-transitory readable storage medium on which a computer program is stored, wherein the program is executed by a processor to implement the information output method of claim 8.

13. A client device, comprising: a readable storage medium, a processor, and a computer program stored on the readable storage medium and being capable of running on the processor, wherein the program is executed by the processor to implement the information output method of claim 1.

14. A server device, comprising: a readable storage medium, a processor, and a computer program stored on the readable storage medium and being capable of running on the processor, wherein the program is executed by the processor to implement the information output method of claim 8.

15. The client device of claim 13, wherein when detecting whether the search connection is established between the delivery terminal and the beacon device deployed by the target physical object by using a pre-cached joint beacon atlas bound to the target physical object, the program is executed by the processor to:
- acquire a scanned first communication identifier list broadcasted by a short-range beacon device, wherein the short-range beacon device is a beacon device within a preset distance range of the delivery terminal;
- form the pre-cached joint beacon atlas bound to the target physical object into a second communication identifier list, and match the second communication identifier list with the first communication identifier list to obtain a matching result of communication identifiers;
- if the matching result of the communication identifiers meets preset conditions, determine that the search connection is established between the delivery terminal and the beacon device deployed by the target physical object.

16. The client device of claim 15, wherein when acquiring the scanned first communication identifier list broadcasted by the short-range beacon device, the program is executed by the processor to:
- acquire broadcast information sent from the beacon device within the preset distance range of the delivery terminal through polling;
- extract communication identifiers and strength indication information broadcasted by the beacon device from the broadcast information;
- form the communication identifiers broadcasted by the beacon device into the first communication identifier list based on the strength indication information.

17. The client device of claim 16, wherein when forming the communication identifiers broadcasted by the beacon device into the first communication identifier list based on the strength indication information, the program is executed by the processor to:
- acquire position information of the delivery terminal by interacting with map engine data;
- take the strength indication information as a basis for a distance between the delivery terminal and the beacon device and calculate distance information formed between the delivery terminal and the beacon device by using a built-in positioning algorithm of the delivery terminal and the position information of the delivery terminal;
- order the communication identifiers broadcasted by the beacon device according to distance values in the distance information being from small to large to form the first communication identifier list.

18. The client device of claim 15, wherein communication identifiers in the second communication identifier list carry confidence of the communication identifiers that serve as communication identifiers broadcasted by the beacon device deployed by the target physical object; communication identifiers in the first communication identifier list carry distance information formed between the delivery terminal and the beacon device; and
- when forming the pre-cached joint beacon atlas bound to the target physical object into the second communication identifier list, and matching the second communication identifier list with the first communication identifier list to obtain the matching result of the communication identifiers, the program is executed by the processor to:
  - form the communication identifiers in the first communication identifier list in a first traversal order based on distances in the distance information formed between the delivery terminal and the beacon device being from short to long;
  - form the communication identifiers in the second communication identifier list in a second traversal order based on the confidence of the communication identifiers that serve as the communication identifiers broadcasted by the beacon device deployed by the target physical object being from high to low; and
  - match the communication identifiers in the second communication identifier list with the communication identifiers in the first communication identifier list according to the first traversal order and/or the second traversal order to obtain the matching result of the communication identifiers;
- if the matching result of the communication identifiers meets the preset conditions, when determining that the search connection is established between the delivery terminal and the beacon device deployed by the target physical object, the program is executed by the processor to:
  - if the matching result of the communication identifiers is consistent, respectively acquire confidence of consistently matched communication identifiers that serve as the communication identifiers broadcasted by the beacon device deployed by the target physical object and the distance information formed between the delivery terminal and the beacon device;
  - if the confidence is greater than a first preset threshold or the distance information is less than a second preset threshold, determine that the matching result of the communication identifiers meets the preset conditions, and determine that the search connection is established between the delivery terminal and the beacon device deployed by the target physical object.

19. The client device of claim 13, wherein before detecting whether the search connection is established between the delivery terminal and the beacon device deployed by the target physical object by using the pre-cached joint beacon atlas bound to the target physical object, the program is executed by the processor to further:
- acquire an order list of the delivery terminal, and transmit target physical object information corresponding to an order in the order list to a server side, so that the server side selects a joint beacon atlas bound to the target physical object according to the target physical object information;
- receive and cache the joint beacon atlas bound to the target physical object.

20. The client device of claim 13, wherein after outputting the corresponding time point when the search connection is in the stable state as the information of the delivery resource arriving at the target physical object, the program is executed by the processor to further:
- in response to the outputting of the information of the delivery resource arriving at the target physical object, generate an order state update event;
- synchronize the information to each information platform based on the order state update event.

* * * * *